Figure 1:
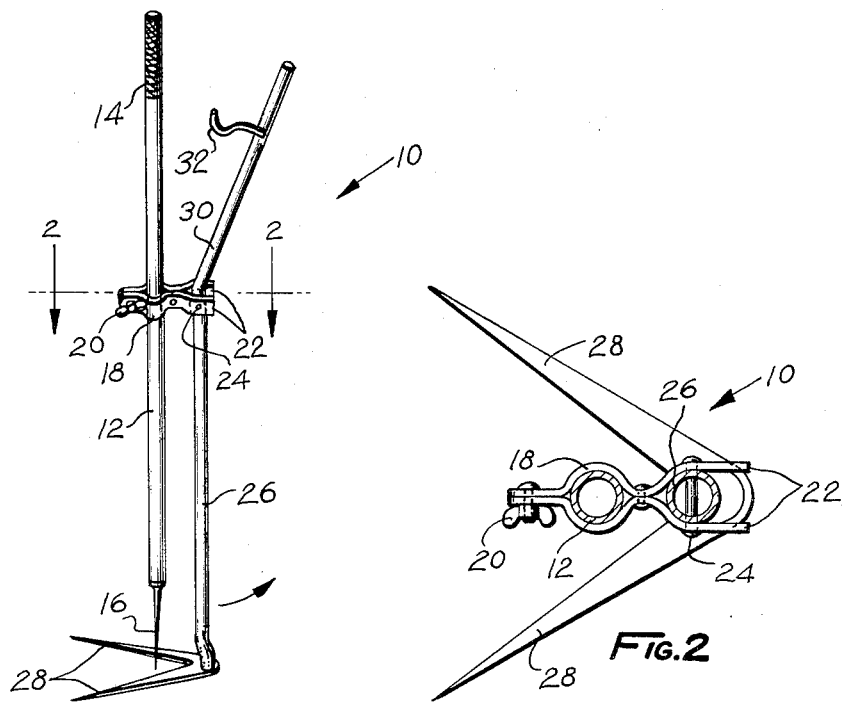

Jan. 2, 1962     J. O. McCLURE     3,015,180

FLOUNDER GIG

Filed Aug. 10, 1960

INVENTOR.
JESSIE O. McCLURE 3,015,180
FLOUNDER GIG
Jessie O. McClure, 881 Phillips Lane, Mobile, Ala.
Filed Aug. 10, 1960, Ser. No. 48,593
3 Claims. (Cl. 43—6)

This invention relates to fishing apparatus and more particularly to a device for safely gigging flounder.

It is an object of the present invention to provide an extremely simple and easy to use flounder gig which will provide for the spearing and lifting of the flounder into the boat or tub.

A further object of the present invention is to provide a manually operated flounder gig of the above type which will enable such fish to be speared and placed into the desired receptacle without manual handling thereof, thus avoiding contact with otherwise dangerous fish not easily identified or distinguished from flounder.

Other objects of the invention are to provide a flounder gig bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side elevational view of a flounder gig made in accordance with the present invention; and FIGURE 2 is an enlarged cross sectional view taken along line 2—2 of FIGURE 1.

Referring now more in detail to the drawing, a flounder gig 10 made in accordance with the present invention is shown to include a spear 12 having a handle 14 at one end and a piercing point 16 at the opposite end. This spear 12 is slidably supported upon one end of a bracket 18 having a thumb screw 20 for adjusting the sliding fit between the spear and the bracket. The opposite end of the bracket 18 is provided with a pair of spaced apart parallel arms 22 having a hinge pin 24 extending therebetween and supporting a central portion of a lever 26 thereupon.

The lower end of the lever 26 is provided with a bifurcated fork 28 which projects into the path of movement of the piercing point 16 of the spear 12 in one adjusted position of the lever 26. The opposite end of the lever 26 is provided with an offset handle portion 30 having a latch mechanism 32 for engagement with the handle portion of the spear 12 to secure the platform formed by the tines 28 in an outwardly displaced position out of the path of movement of the piercing point 16.

In actual use, the lever 26 is maintained in an adjusted position by engaging the latch member 32 with the handle portion of the spear 12, so that the tines 28 are out of the path of movement of the spear 12 and piercing point 16, thus enabling the user to spear a fish. Immediately following the spearing of the fish, the lever 26 is rotated to the adjusted position shown in full lines in FIGURE 1, so that the tines 28 will extend beneath the fish and form a platform therefor. It is thus possible for the user to raise the gig out of the water with the fish impaled thereupon so that the fish can be placed within the boat or a tub without manual handling thereof.

This device is extremely easy to use, especially for relatively inexperienced and novice fishermen. It virtually eliminates the danger of accidentally picking up dangerous fish, such as stinger rays, or the like, which resemble the flounder being fished for. Of course, by adjusting the thumb screw 20, the position of the spear 12 relative to the lever 26 may be conveniently adjusted.

While various changes may be made in the detail construction, it shall be understood that such changes shall be within the spirit and scope of the present invention as defined by the appended claims.

What I claim as new and desire to protect by Letters Patent of the United States is:

1. A flounder gig comprising, in combination, a bracket, a spear adjustably supported upon one end of said bracket, a lever pivotally carried upon an opposite end of said bracket, said lever being supported for pivotal movement within a single plane lying normal to the longitudinal axis of said spear, a platform at one end of said lever movable into the path of movement of said spear, a latch at the opposite end of said lever for controlling the position of said platform relative to said spear, said bracket comprising a pair of plates, said plates being secured together centrally intermediate the opposite ends thereof, a thumb screw carried by one end of said plates for clamping said spear in an adjusted position therebetween, and said spear comprising an elongated shaft having a handle at one end with a piercing point at the opposite end in the vicinity of said platform.

2. The combination according to claim 1, wherein said lever comprises an elongated shaft having said platform at one end, and the opposite end of said lever being offset from the longitudinal axis of said one end thereof within said plane of movement of said lever and the longitudinal axis of said spear.

3. The combination according to claim 2, wherein said platform comprises a bifurcated fork having a pair of angularly related tines, said tines being movable in response to pivotal movement of said lever from an outwardly displaced position into a fish supporting position adjacent to said piercing point of said spear.

References Cited in the file of this patent
FOREIGN PATENTS

| | | |
|---|---|---|
| 456,998 | Canada | May 31, 1949 |
| 606,406 | France | Mar. 8, 1926 |